(12) United States Patent
Jin

(10) Patent No.: US 8,896,667 B2
(45) Date of Patent: Nov. 25, 2014

(54) STEREOSCOPIC IMAGING SYSTEMS WITH CONVERGENCE CONTROL FOR REDUCING CONFLICTS BETWEEN ACCOMODATION AND CONVERGENCE

(75) Inventor: Elaine W. Jin, Fremont, CA (US)

(73) Assignee: Aptina Imaging Corporation, George Town (KY)

( * ) Notice: Subject to any disclaimer, the term of this patent is extended or adjusted under 35 U.S.C. 154(b) by 600 days.

(21) Appl. No.: 12/911,686

(22) Filed: Oct. 25, 2010

(65) Prior Publication Data
US 2012/0098938 A1   Apr. 26, 2012

(51) Int. Cl.
*H04N 13/00* (2006.01)
*H04N 15/00* (2006.01)
*H04N 13/02* (2006.01)

(52) U.S. Cl.
CPC ....... *H04N 13/0239* (2013.01); *H04N 13/0271* (2013.01); *H04N 13/0246* (2013.01)
USPC ................. 348/47; 348/42; 348/43; 348/46

(58) Field of Classification Search
CPC .......... H04N 13/0246; H04N 13/0239; H04N 13/0271
USPC .......................................... 348/42, 43, 46, 47
See application file for complete search history.

(56) References Cited

U.S. PATENT DOCUMENTS

| | | | |
|---|---|---|---|
| 4,603,952 A | 8/1986 | Sybenga | |
| 5,063,441 A | 11/1991 | Lipton et al. | |
| 5,140,415 A | 8/1992 | Choquet | |
| 5,142,357 A | 8/1992 | Lipton et al. | |
| 5,175,616 A | 12/1992 | Milgram et al. | |
| 5,740,337 A | 4/1998 | Okino et al. | |
| 5,786,847 A * | 7/1998 | Katayama et al. | 348/47 |
| 6,246,382 B1 | 6/2001 | Maguire, Jr. | |
| 6,862,140 B2 | 3/2005 | Ogino | |
| 6,864,910 B1 | 3/2005 | Ogino et al. | |
| 7,555,142 B2 * | 6/2009 | Hildreth et al. | 382/103 |

\* cited by examiner

*Primary Examiner* — Geepy Pe
(74) *Attorney, Agent, or Firm* — Treyz Law Group

(57) ABSTRACT

An electronic device may have a stereoscopic camera module with left and right image sensors separated by a stereo base line. The camera module may have an adjustable convergence such that the position at which objects are captured by the left and right image sensors with zero horizontal disparity can be moved closer to and farther from the electronic device. The convergence of the camera module may be adjusted such that a region of interest or an object (i.e., subject) is captured with minimal horizontal disparity. With arrangements of this type, conflicts between accommodation (e.g., the location of a display) and convergence (e.g., the perceived location of the region of interest or subject either behind, on the plane of, or in front of a display) may be reduced.

15 Claims, 8 Drawing Sheets

STEREOSCOPIC IMAGING SYSTEMS WITH CONVERGENCE CONTROL FOR REDUCING CONFLICTS BETWEEN ACCOMODATION AND CONVERGENCE

BACKGROUND

This relates to stereoscopic imaging systems and, more particularly, to stereoscopic imaging systems with convergence control for reducing conflicts between accommodation and convergence.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Stereoscopic imaging (e.g., three-dimensional imaging) is becoming increasingly popular. In stereoscopic imaging, left and right images of a scene are captured from two difference perspectives. As a result, different depth planes in the scene are encoded in an image pair as differences in horizontal disparities. A converging depth plane has zero disparity (e.g., an object in the converging depth plane will have the same position in both the left and right images). Depths planes closer to an imager than the converging depth plane will be encoded as crossed disparities (e.g., disparities which induce the viewer's eyes to cross) and depth planes farther from the imager than the converging depth plane will be encoded as uncrossed disparities (e.g., disparities which induce the viewer's eyes to uncross). When stereoscopic images are displayed on a display, the encoded horizontal disparities (e.g., the differences between the left and right images of a scene) are perceived by viewers as different depth planes in front of and/or behind the display, resulting in the perception of a three-dimensional image.

Conventional stereoscopic camera systems include convergence control in which the location of the converging depth plane can be changed. In particular, some stereoscopic camera systems include manual controls that allow an operator to manually adjust the location of the converging depth plane (e.g., to adjust the distance from the stereoscopic camera at which objects in a scene will be in the converging depth plane and encoded with zero disparity). In other stereoscopic camera systems, the location of the converging depth plane is tied to a lens zoom setting (e.g., at a wide angle zoom, the converging depth plane is relatively close to the stereoscopic camera and, at a telephoto zoom, the converging depth plane is relatively distant from the stereoscopic camera).

One problem with viewing stereoscopic images and video is the conflict between accommodation stimuli and convergence stimuli. Accommodation is the change in focus of the lens of a user's eyes. Convergence is the movement (e.g., horizontal rotation) of the user's eyes to point to the same position in space. In the natural world, the cues for convergence and accommodation are consistent and the convergence and accommodation mechanisms are linked together. In stereoscopic imaging, however, convergence and accommodation stimuli are not linked, which can lead to conflicts and viewer discomfort.

When viewing a stereoscopic image on a display, a viewer's eyes focus on the display. If the viewer's eyes focus anywhere away from the display, the stereoscopic image would appear blurred. The display therefore serves as a cue for accommodation. In contrast, the horizontal disparities in the stereoscopic image (e.g., the differences between the left eye and right eye images) create convergence cues via the perception that the stereoscopic image extends in front of and behind the display, which guides the viewer's eyes away from the display. Once the viewer's eyes are guided away from the display (by convergence cues), the stereoscopic image will appear blurred and the accommodation cues will try to shift the viewer's focus back to the display. This conflict can make viewing stereoscopic images discomforting.

It would therefore be desirable to provide improved stereoscopic imaging systems with convergence control for reducing conflicts between accommodation and convergence.

DETAILED DESCRIPTION

Figure 1:
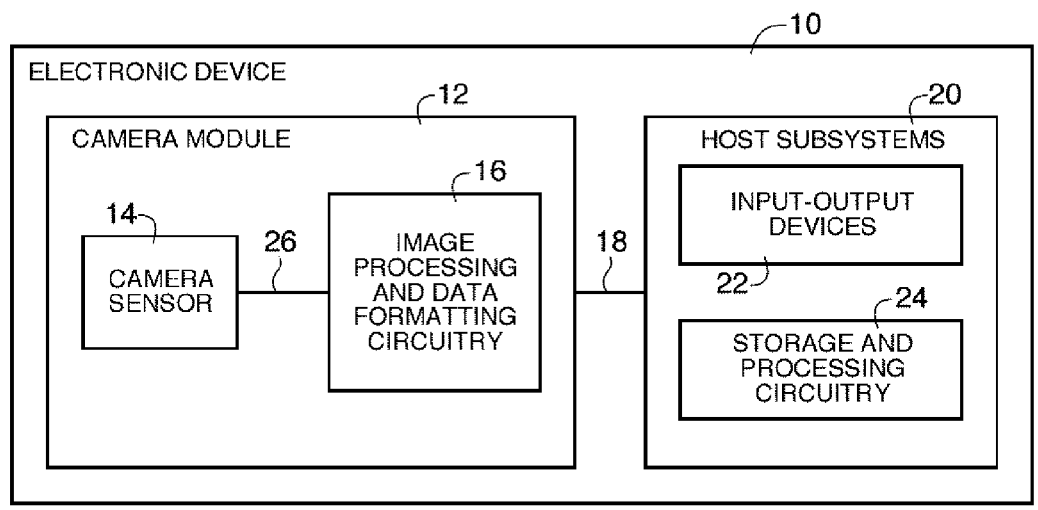
FIG. 1 is a diagram of an illustrative electronic device that may include a stereoscopic camera module with convergence control for reducing conflicts between accommodation and convergence in accordance with an embodiment of the present invention.

An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include address circuitry, analog-to-digital (ADC) converter circuitry amplifier circuitry, switching circuitry (e.g., randomizing switching circuitry), data output circuitry, sample-and-hold circuitry, correlated double sampling (CDS) circuitry, memory (e.g., buffer circuitry), bias circuitry (e.g., source follower load circuits), etc.

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, camera sensor 14 and image processing and data formatting circuitry 16 are implemented on a common integrated circuit. The use of a single integrated circuit to implement camera sensor 14 and image processing and data formatting circuitry 16 can help to minimize costs.

Camera module 12 (e.g., image processing and data formatting circuitry 16) conveys acquired image data to host subsystem 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Camera module 12 may be a stereoscopic camera module. As an example, camera sensor 14 may be a stereoscopic camera sensor and sensor 14 may include a left camera sensor and a right camera sensor. If desired, camera module 12 may include left and right camera sensors 14 and left and right lenses that focus light onto the left and right camera sensors 14, respectively. With another arrangement, a single lens (or a series of lenses) may focus light on both the left and right sensors. With these and other types of arrangements, camera module 12 may capture stereoscopic images and videos (e.g., left and right images and videos). When the stereoscopic images and videos are viewed by a viewer (e.g., using liquid crystal shutter glasses, polarized glasses, or other techniques), the viewer is able to perceive the relative distances between objects imaged by camera module 12.

Figure 2:
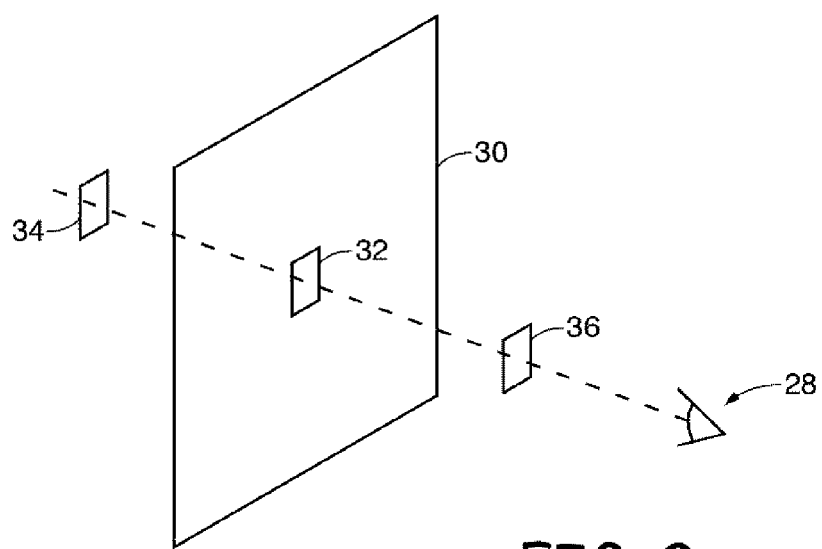
FIG. 2 is a perspective diagram of illustrative depth planes in three-dimensional scenes and stereoscopic images in accordance with an embodiment of the present invention.

As shown in FIG. 2, a viewer 28 may view stereoscopic images on display 30. Objects that appear to the viewer 28 to be on the same depth plane as display 30, such as object 32, may be said to be located on a converging depth plane. Objects that appear to the viewer 28 to be behind display 30, such as object 34, may be said to be located on an uncrossed depth plane. Objects that appear to the viewer 28 to be located in front of display 30, such as object 36, may be said to be located on a crossed depth plane.

Figure 3:
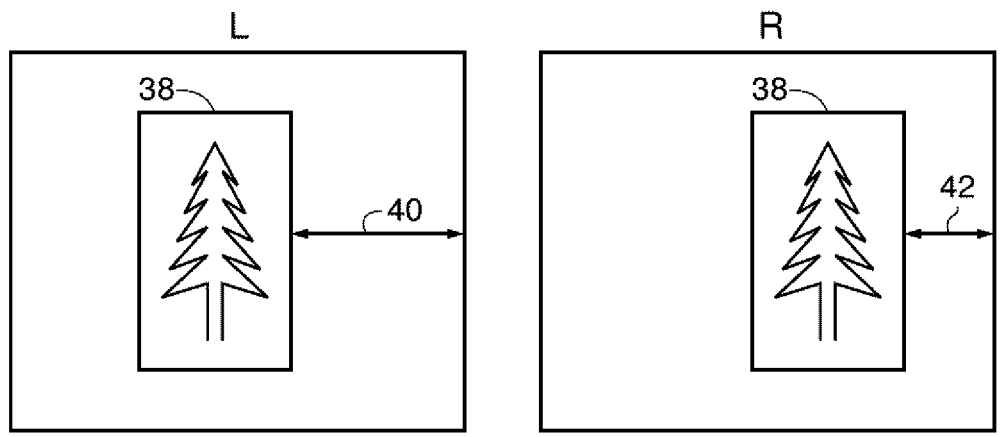
FIG. 3 is a diagram of illustrative horizontal disparities between left and right images that form a stereoscopic image in accordance with an embodiment of the present invention.

As shown in FIG. 3, a stereoscopic image may include left (L) and right (R) images. The distance from a stereoscopic camera such as camera module 12 and objects in a scene may be encoded by the difference in horizontal positions of an object such as object 38 in the left and right images. In the example of FIG. 3, object 38 is located at a distance 40 from the right side of the left image and a distance 42 from the right side of the right image. Differences in distances 40 and 42 may determine if object 38 is in an uncrossed depth plane, a converging depth plane, or a crossed depth plane and may therefore determine whether a viewer perceives object 38 behind, on, or in front of a display medium.

Figure 4:
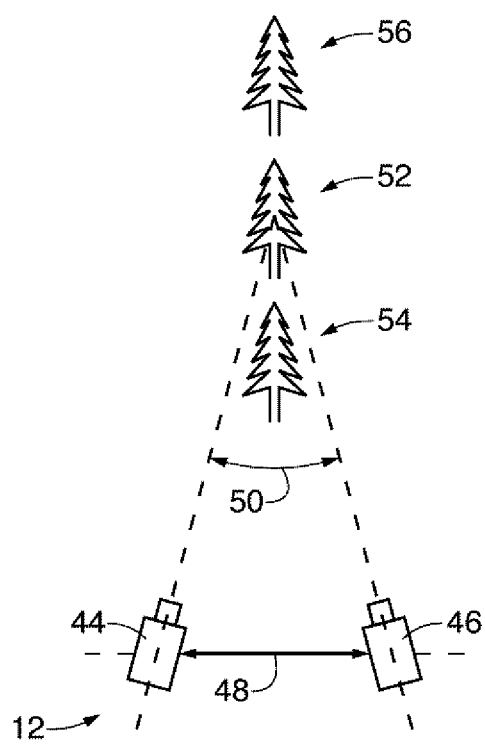
FIG. 4 is a diagram of illustrative depth planes in three-dimensional scenes and a stereoscopic imaging system in accordance with an embodiment of the present invention.

As shown in FIG. 4, a stereoscopic image may be captured by camera module 12 with left and right cameras 44 and 46. Left camera 44 may be separated from right camera by distance 48 (e.g., distance 48 may define the stereo base line between cameras 44 and 48). Cameras 44 and 46 may, if desired, be pointed towards a zero disparity position (e.g., such as the position of object 52). With this type of arrangement, camera convergence angle 50 may define the angular separation of cameras 44 and 46, as viewed from an observer located at the zero disparity position (e.g., on the converging depth plane). Objects such as object 54 that are closer to cameras 44 and 46 than the zero disparity position will have a crossed disparity between the image captured by camera 44 and the image captured by camera 46 (e.g., object 54 will have a crossed disparity). Objects such as object 56 that are farther away from cameras 44 and 46 than the zero disparity position will have an uncrossed disparity between the image captured by camera 44 and the image captured by camera 46 (e.g., object 56 will have an uncrossed disparity).

Figure 5:
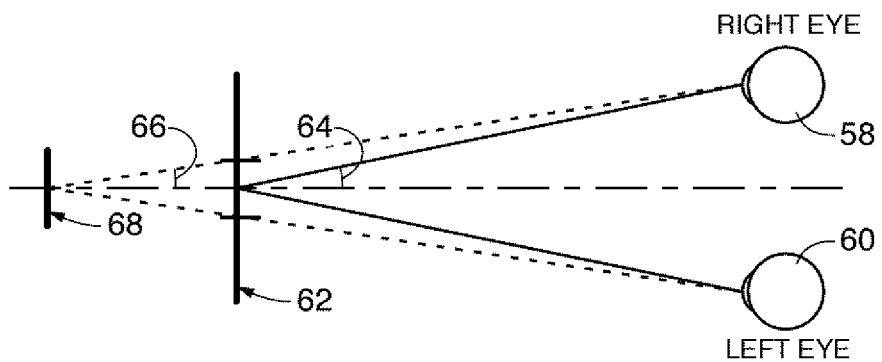
FIG. 5 is a diagram of illustrative convergence and accommodation stimuli for a viewer's eyes in accordance with an embodiment of the present invention.

The potential for conflict between accommodation stimuli and convergence stimuli is illustrated in FIG. 5. As shown in FIG. 5, a viewer with right eye 58 and left eye 60 may view stereoscopic images on a display medium such as display 62. The display medium 62 creates an accommodation stimulus for the viewer's right and left eyes 58 and 60. The accommodation stimulus encourages the viewer's eyes to focus on the display medium 62. Angle 64 defines the convergence angle for the right and left eyes 58 and 60 to converge on the display medium 62. While the viewer's eyes are drawn to the accommodation stimulus of display medium 62, the stereoscopic image may include objects that appear behind or in front of display medium 62 such as object 68. These objects create a convergence stimulus for the viewer's eyes. The convergence stimulus of object 68 encourages the viewer's eyes to focus away from the display medium 62 on which object 68 is actually displayed. When the viewer focuses their attention on objects such as object 68 that are in front of or behind display medium 62, the convergence stimulus of the object will conflict with the accommodation stimulus of display medium 62, potentially causing discomfort for the viewer.

Angle 66 defines the convergence angle for the right and left eyes 58 and 60 to converge on the virtual position of object 68 (e.g., the perceived position of object 68 behind display medium 62).

In order to reduce and/or minimize potential discomfort for viewers, the primary object in a scene may be moved to a zero disparity position, by adjusting convergence of a stereoscopic imaging system capturing the scene (e.g., by adjusting the distance from the imaging system at which objects in the scene are encoded with zero horizontal disparity). The primary object or objects in a scene may be the elements in a scene that viewers are likely to focus their attention on. For example, in a scene of two people conversing, the person talking may be considered to be the primary element of the scene. With arrangements of this type, a viewer viewing the stereoscopic images may focus their attention on the primary object. Because the viewer will perceive the primary object as being at or near the position of a display medium, the conflict between the accommodation stimulus of the display medium and the convergence stimulus of the primary object may be reduced and/or minimized. If desired, the primary object or element may be moved to a biased position in front of or behind the zero disparity positions, by adjusting the convergence of stereoscopic imaging system 12.

Various techniques may be used in adjusting the convergence of a stereoscopic imaging system (e.g., in adjusting the distance from the imaging system at which objects are encoded with zero disparity). Some of the techniques that may be used in adjusting the convergence of a stereoscopic imaging system such as stereoscopic camera module 12 (e.g., left and right camera sensors 14) are shown in FIGS. 6, 7, 8, 9, 10A, and 10B. Electronic device 10 may include circuitry that adjusts the convergence of camera module 12. As an example, image processing and data formatting circuitry 16 may include convergence control circuitry that adjusts the convergence of stereo camera sensors.

Figure 6:
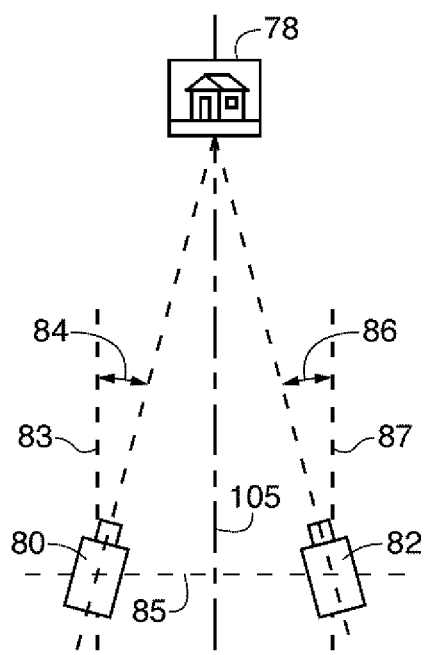
FIG. 6 is a diagram of an illustrative stereoscopic imaging system with convergence control in which left and right cameras may be rotated to adjust the distance from the cameras at which left and right images converge in accordance with an embodiment of the present invention.

As shown in FIG. 6, stereoscopic camera module 12 may include left camera 80 and right camera 82 (e.g., left and right camera sensors 14). Cameras 80 and 82 may be rotated relative to each other in order to adjust the convergence of stereoscopic camera module 12. As indicated by arrows 84, left camera 80 may be rotated between the stereo baseline 85 between camera modules 80 and 82 and a downrange direction 83. As indicated by arrows 86, right camera 82 may be rotated between the stereo baseline 85 between cameras 80 and 82 and the downrange direction 87. When it is desired to move the zero-disparity position further out from camera module 12, left camera 80 and right camera 82 may be rotated towards downrange directions 83 and 87, respectively. When it is desired to move the zero-disparity position closer to camera module 12, left camera 80 and right camera 82 may be rotated away from downrange directions 83 and 87, respectively (e.g., towards stereo baseline 85).

Figure 7:
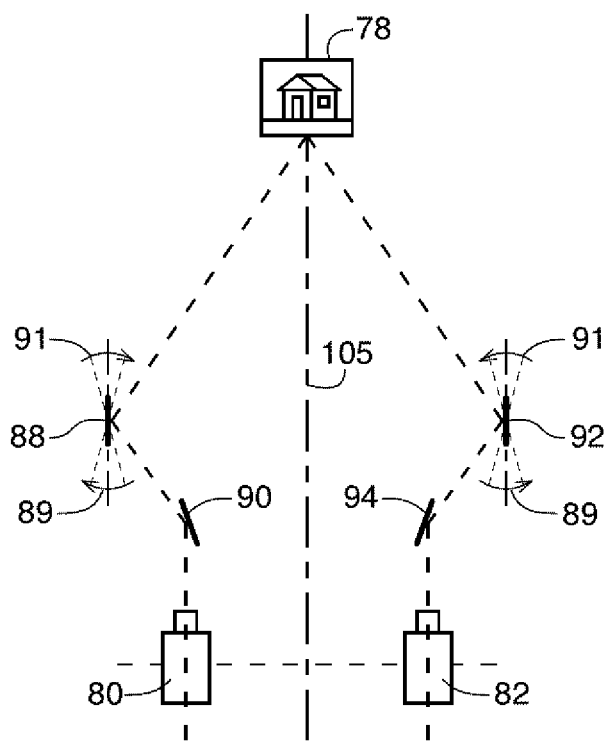
FIG. 7 is a diagram of an illustrative stereoscopic imaging system with convergence control in which pairs of lenses may be adjusted to adjust the distance from left and right cameras at which left and right images converge in accordance with an embodiment of the present invention.

A second technique for adjusting the convergence of stereoscopic imaging systems such as system 12 is shown in FIG. 7. As shown in FIG. 7, stereoscopic camera module 12 may include a pair of mirrors 88 and 90 associated with left camera 80 and a pair of mirrors 92 and 94 associated with right camera 82. When it is desired to move the zero-disparity position further out from camera module 12, mirrors 88 and 92 may be rotated in direction 89 (e.g., away from the stereo baseline) and mirrors 90 and 94 may be rotated to ensure that light still strikes cameras 80 and 82 (e.g., mirrors 90 and 94 may rotated in the opposite direction). When it is desired to move the zero-disparity position closer to camera module 12, mirrors 88 and 92 may be rotated in direction 91 (e.g., towards from the stereo baseline) and mirrors 90 and 94 may be rotated to ensure that light still strikes cameras 80 and 82 (e.g., mirrors 90 and 94 may rotated in the opposite direction).

Figure 8:
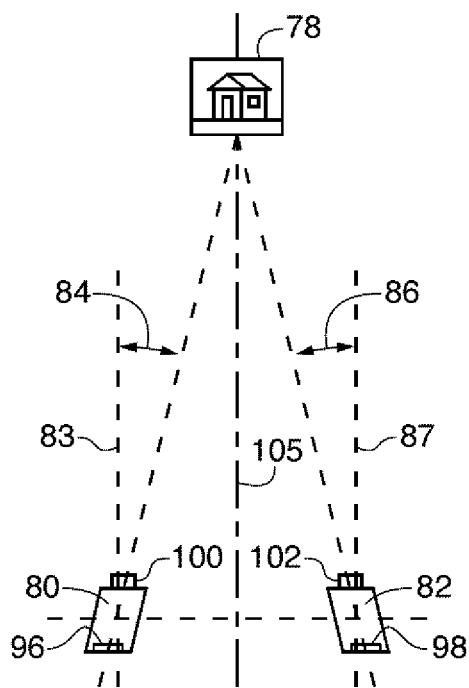
FIG. 8 is a diagram of an illustrative stereoscopic imaging system with convergence control in which left and right lenses may be shifted relative to left and right image sensors to adjust the distance from left and right cameras at which left and right images converge in accordance with an embodiment of the present invention.

A third technique for adjusting the convergence of stereoscopic imaging systems such as imaging system 12 is shown in FIG. 8. As shown in FIG. 8, left camera 80 may include image sensor 96 and lens 100 and right camera 82 may include image sensor 98 and lens 102. When it is desired to move the zero-disparity position closer to camera module 12, lenses 100 and 102 may be shifted away from downrange directions 83 and 87, respectively. Conversely, when it is desired to move the zero-disparity position further out from camera module 12, lenses 100 and 102 may be shifted towards downrange directions 83 and 87, respectively.

Figure 9:
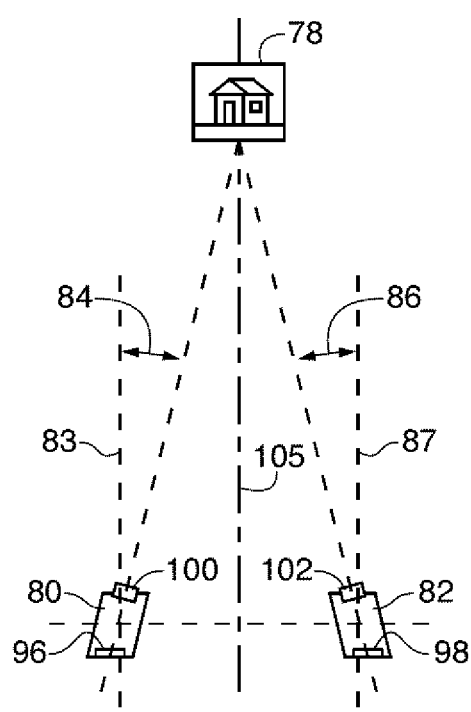
FIG. 9 is a diagram of an illustrative stereoscopic imaging system with convergence control in which left and right lenses may be shifted and tilted relative to left and right image sensors to adjust the distance from left and right cameras at which left and right images converge in accordance with an embodiment of the present invention.

A variation on the technique of FIG. 8 is shown in FIG. 9. As shown in FIG. 9, lenses 100 and 102 may be tilted so that the lenses are perpendicular to objects such as object 78 at zero-disparity positions. With this type of arrangement and when it is desired to adjust the convergence of imaging system 12, lenses 100 and 102 may shifted (as described in connection with FIG. 9) and may also be tilted as needed to keep the lenses perpendicular to objects such as object 78 at zero-disparity positions.

Figure 10A:
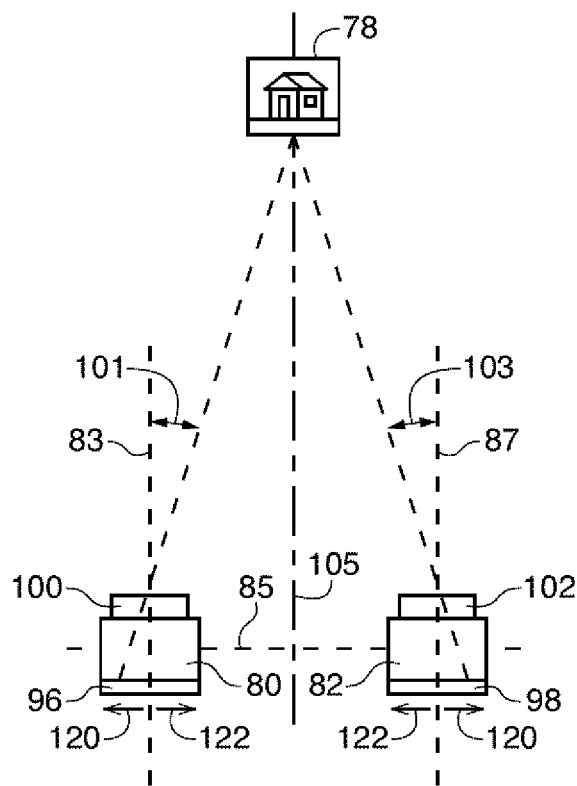
FIG. 10A is a diagram of an illustrative stereoscopic imaging system with convergence control in which cropping of left and right image sensors may be varied to adjust the distance from left and right cameras at which left and right images converge in accordance with an embodiment of the present invention.
Figure 10B:
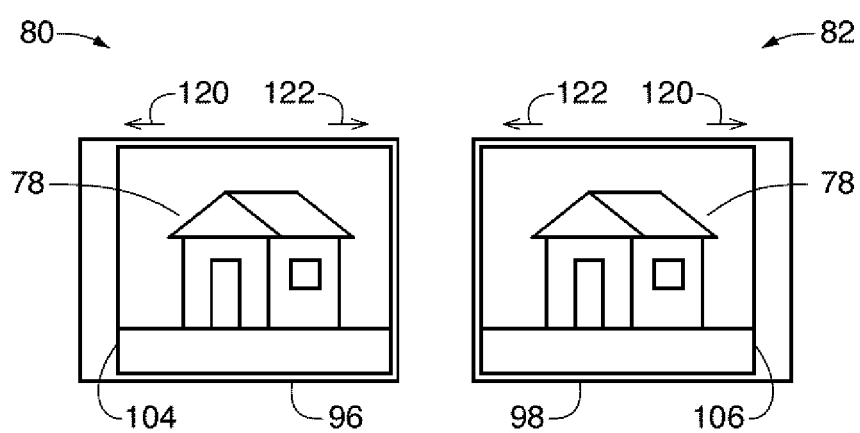
FIG. 10B is a diagram of the illustrative left and right image sensors of FIG. 10A showing how convergence may be adjusted by selectively cropping images from the left and right image sensors in accordance with an embodiment of the present invention.

Another technique for adjusting the convergence of stereoscopic imaging systems such as stereoscopic camera module 12 of device 10 (FIG. 1) is shown in FIGS. 10A and 10B. As shown in FIG. 10A, stereoscopic camera module 12 may include left camera 80 with an image sensor 96 and a lens 100 and right camera 82 with an image sensor 98 and a lens 102. The left and right cameras 80 and 82 may be separated by a stereo baseline 85 and may be pointed downrange along directions 83 and 87, respectively (e.g., a direction perpendicular to stereo baseline 85). If desired, cameras 80 and 82 may be tilted somewhat away from directions 83 and 87 towards objects such as object 78.

Image sensors 96 and 98 may be oversized. With this type of arrangement, the resolution of images output by image sensor 96 and images output by image sensor 98 may sometimes be less than the total number of image sensing pixels in sensor 96 and in sensor 98, respectively. The convergence of image sensor 12 (e.g., the distance along direction 105 at which objects have zero horizontal disparity between images captured by left camera 80 and right camera 82) may be adjusted by selectively utilizing (e.g., cropping) different portions of image sensors 96 and 98. For example, when it is desired to move the zero-disparity position closer to camera module 12 (e.g., to increase angles 101 and 103), the active (cropped) portion of image sensors 96 and 98 may move in direction 120. Conversely, when it is desired to move the zero-disparity position further out from camera module 12 (e.g., to decrease angles 101 and 103), the active (cropped) portion of image sensors 96 and 98 may move in direction 122.

A diagram of image sensors 96 and 98 of FIG. 10A is shown in FIG. 10B. As shown in FIG. 10B, only a cropped portion 104 of image sensor 96 may be actively used in capturing image data and only a cropped portion 106 of image sensor 98 may be actively used in capturing image data. By moving the cropped regions 104 and 106 horizontally within oversized image sensors 96 and 98, the convergence of a stereoscopic camera module such as camera module 12 that includes cameras 96 and 98 can be adjusted. For example, when it is desired to move the convergence point farther out from camera module 12, cropped portions 104 and 106 may be moved in direction 122. Conversely, when it is desired to move the convergence point closer to camera module 12, cropped portions 104 and 106 may be moved in direction 120.

If desired, image data extending beyond cropped portions 104 and 104 (e.g., full-frame image data including image data from all of the pixels in sensors 96 and 98) may be captured and stored. With this type of arrangement, post-capture image processing operations may be used to adjust the point of convergence after the stereoscopic images have been captured (e.g., by cropping the image data after it has been captured). With one suitable arrangement, stereoscopic images displayed on large-format displays (e.g., theatre screens, televisions etc.) may be biased into the displays. With this type of arrangement, post-capture image processing and image capture operations may be adjusted for large-format displays such that more of a scene appears behind the screen than in front of the screen (e.g., stereoscopic images that recede into a display may have increased visual impact on large-format displays). Conversely, stereoscopic images displayed on small-format displays (e.g., portable video game player screens, cell phone display screens, etc.) may be biased outward from the displays. With this type of arrangement, post-capture image processing and image capture operations may be adjusted for small-format displays such that more of a scene appears in front of the screen than behind the screen (e.g., stereoscopic images that pop-up out of a display may have increased visual impact on small-format displays).

With one suitable arrangement, the possibility of inducing discomforting conflicts between accommodation and convergence stimuli may be reduced and or minimized by capturing stereoscopic images in which primary elements in a scene are encoded with relatively small amounts of horizontal disparity (e.g., by adjusting the point of convergence to be near the primary elements). The primary elements in the scene may be those elements that attract the attention and focus of viewers. The primary elements in a scene may be determined manually by an operator of a stereoscopic imaging system such as device 10. If desired, the primary elements in a scene may be determined automatically by stereoscopic imaging systems such as device 10.

One technique for identifying the desired location of the point of convergence (e.g., the zero disparity depth plane) may be to use focus information. With this type of arrangement, the point of convergence can be set to whatever element in a scene the imaging system is focused on (whether the focusing occurred manually or automatically). For example, if the imaging system's is focus is set for a distance of 10 meters, the point of convergence may also be set for a distance of 10 meters. If desired, the point of convergence may be user adjustable so that the point of convergence is biased a user-defined amount either in front of or behind the focus distance.

Figure 11:
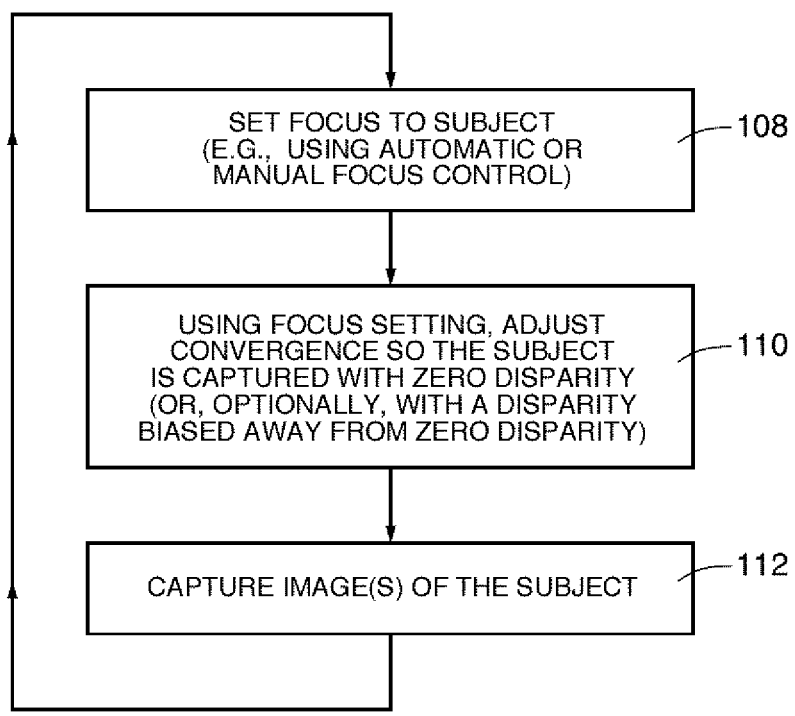
FIG. 11 is a flow chart of illustrative steps involved in capturing stereoscopic images with an imaging system in which convergence may be controlled using focus settings in accordance with an embodiment of the present invention.

A flow chart of illustrative steps involved in using focus information to adjust convergence of a stereoscopic imaging system such as stereo camera module 12 is shown in FIG. 11.

In step 108, the focus of one or more lenses associated with stereo camera sensor 14 may be adjusted. As examples, the focus of the lenses may be adjusted manually by a user of device 10 or may be adjusted automatically by device 10 (e.g., using any desired automatic focus mechanism).

In step 110, the convergence of stereo camera sensor 14 may be adjusted using information on the focus of the lenses. As an example, the convergence of sensor 14 may be adjusted such that objects and elements that are in focus are also captured with zero disparity (or, when a user supplied bias has been added, are captured with a disparity biased away from zero disparity by a user-controlled amount).

In step 112, stereo camera sensor 14 may capture one or more images or video of the subject (e.g., the subject that the lenses of camera module 12 were focused on in step 108) as well as any surrounding elements.

Another technique for identifying the desired location of the point of convergence may be to identify a region of interest. With this type of arrangement, the point of convergence can be set to the region of interest. The region of interest may be whatever element in a scene a user or the imaging system determines is a region that is likely to draw a viewer attention. Because the point of convergence is near the region of interest in a scene, it is less likely a viewer viewing the resulting stereoscopic image will focus their attention on elements away from the converging depth plane (e.g., the display), thereby reducing the likelihood the viewer will experience discomfort from a contention between accommodation and convergence stimuli.

Figure 12:
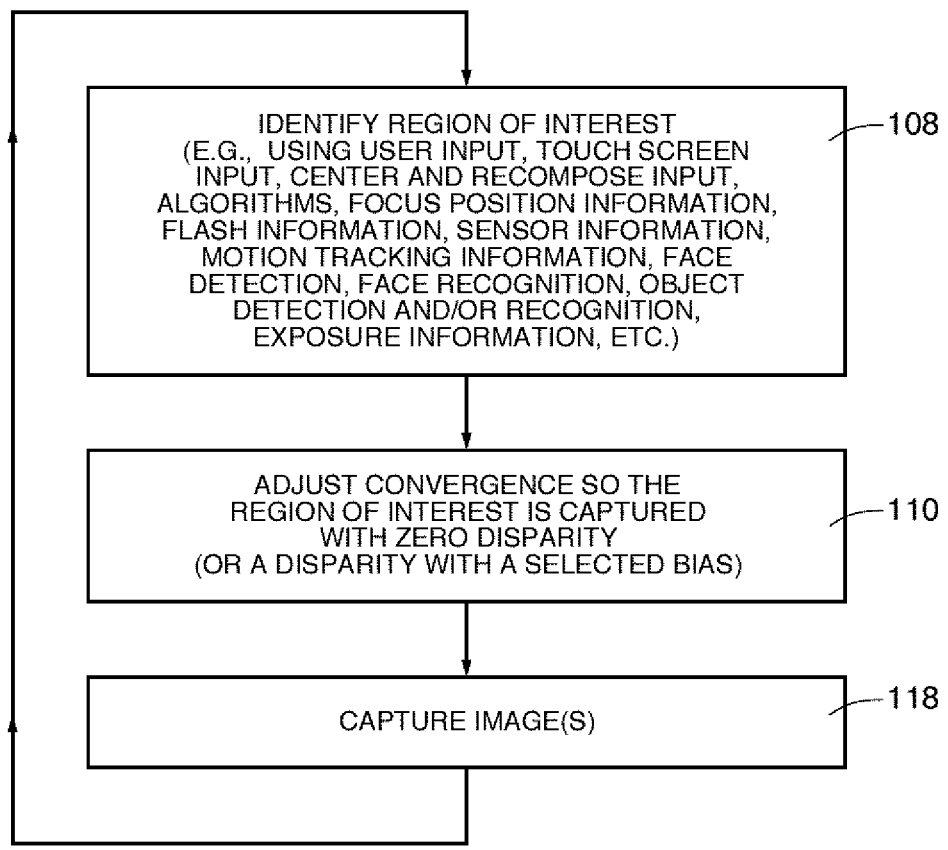
FIG. 12 is a flow chart of illustrative steps involved in capturing stereoscopic images with an imaging system in which convergence may be controlled based on a region of interest in a scene in accordance with an embodiment of the present invention.

A flow chart of illustrative steps involved in using region of interest information to adjust convergence of a stereoscopic imaging system such as stereo camera module 12 is shown in FIG. 12.

In step 114, a region of interest in a scene being imaged by stereoscopic camera module 12 may be identified. The region of interest may be identified by user input, by touch screen input (e.g., by a user selecting the region of interest on a touch screen display), by center and recompose input (e.g., by a user centering camera module 12 on a region, partially depressing a shutter button or pressing another button to set the convergence of module 12 on the centered region, and moving the camera module 12 to another region before fully depressing the shutter button to initiate image capture operations), algorithms, focus position information such as described in connection with FIG. 11, flash information (e.g., convergence may be moved closer to camera module 12 when a flash is activated and may be moved away from camera module 12 when a flash is deactivated), sensor information (e.g., range sensors, ambient light sensors, thermal sensors, etc.), motion tracking information (e.g., convergence of camera module 12 may be adjusted in real time to track a moving region of interest), face detection (e.g., convergence of camera module 12 may be automatically adjusted to the distance of one or more faces detected in a scene), face recognition (e.g., convergence of camera module 12 may be automatically adjusted to the distance of one or more pre-determined faces detected in a scene such that the convergence of camera module 12 may track a particular person even in the presence of other persons), object detection, object recognition, exposure information, camera mode information (e.g., whether camera module 12 is operating in a landscape mode in which it may be desirable for the convergence to be set relatively far from camera module 12, a portrait mode in which it may be desirable for the convergence to be set relatively close to camera module 12, or another mode), etc.

In step 116, the convergence of stereo camera sensor 14 may be adjusted using information on the region of interest identified in step 114. As examples, the convergence of stereo sensors 14 may be adjusted so that the region of interest identified in step 114 is captured with zero disparity. With arrangements of this type, when stereoscopic images captured by stereo camera module 12 are played back on a display for a viewer, the region of interest will appear on or near the plane of the display. Because the viewer may be more likely to focus their attention on the region of interest, which is near the plane of the display, conflict between accommodation and convergence stimuli may be reduced. If desired, device 10 may receive user input that biases the convergence of camera module 12 away from the region of interest (e.g., either behind or in front of the region of interest by a user-selected amount). With arrangements of this type, the region of interest may pop-up somewhat from a display or may recede somewhat into the display, however, the region of interest may still be close enough to the plane of the display to avoid excessive conflict between accommodation and convergence stimuli.

In step 118, stereo camera sensors 14 may capture one or more images or video of the region of interest (e.g., the region of interest or subject that was identified in step 114) as well as any surrounding elements.

Various embodiments have been described illustrating stereoscopic imaging systems with convergence control for reducing conflicts between accommodation and convergence.

An electronic device may have a stereoscopic camera module with left and right image sensors separated by a stereo base line.

The camera module may have an adjustable convergence such that the position at which objects are captured by the left and right image sensors with zero horizontal disparity can be moved closer to and farther from the electronic device. The convergence of the camera module may be adjusted using any suitable technique. As one example, the left and right image sensors may be oversized image sensors with a resolution higher than the final output of the camera module. By selectively cropping image data from the image sensors, the convergence of the camera module may be adjusted.

The convergence of the camera module may be adjusted such that a region of interest or an object (i.e., subject) is captured with minimal horizontal disparity. If desired, user-controlled bias to the convergence may be added so that the region of interest or the object is captured with a user-selected amount of uncrossed or crossed disparity (e.g., so that the point of zero convergence is a user-selected distance in front of or behind the region of interest or subject). With arrangements of this type, conflicts between accommodation (e.g., the location of a display) and convergence (e.g., the perceived location of the region of interest or subject either behind, on the plane of, or in front of a display) may be reduced by ensuring that the region of interest or subject is perceived by viewers as being near the plane of a display, when stereoscopic content from the device is viewed using the display.

The foregoing is merely illustrative of the principles of this invention which can be practiced in other embodiments.

What is claimed is:

1. A stereoscopic imaging device that captures stereoscopic images of a scene, comprising:
    a left array of image sensing pixels pointed in a first direction;
    a right array of image sensing pixels pointed in a second direction, wherein the right array is separated from the left array by a stereo baseline, wherein the left and right arrays capture one or more stereoscopic images with an adjustable point of convergence and wherein any elements in the scene that are at the adjustable point of convergence have zero horizontal disparity between images captured by the left array and images captured by the right array, wherein there is a distance between the adjustable point of convergence and the stereoscopic imaging device;
    circuitry that identifies a region of interest in the scene, wherein there is a given distance between the region of interest and the stereoscopic imaging device; and
    convergence control circuitry that adjusts the adjustable point of convergence by adjusting the distance between the adjustable point of convergence and the stereoscopic imaging device using information on the given distance between the region of interest and the stereoscopic imaging device, wherein the convergence control circuitry adjusts the adjustable point of convergence of the left and right arrays from a first point of convergence to a second point of convergence without adjusting the magnitude of the stereo baseline, without adjusting the first direction, and without adjusting the second direction.

2. The stereoscopic imaging device defined in claim 1 wherein the convergence control circuitry adjusts the adjustable point of convergence of the left and right arrays so that the adjustable point of convergence is equal to the given distance between the region of interest and the stereoscopic imaging device.

3. The stereoscopic imaging device defined in claim 1 further comprising:
    circuitry that receives user input including a convergence bias distance that shifts the adjustable point of convergence further away from the stereoscopic imaging device, wherein the convergence control circuitry adjusts the adjustable point of convergence of the left and right arrays so that the adjustable point of convergence is equal to the given distance between the region of interest and the stereoscopic imaging device plus the convergence bias distance.

4. The stereoscopic imaging device defined in claim 1 further comprising:
    circuitry that receives user input including a convergence bias distance that shifts the adjustable point of convergence closer to the stereoscopic imaging device, wherein the convergence control circuitry adjusts the adjustable point of convergence of the left and right arrays so that the adjustable point of convergence is equal to the given distance between the region of interest and the stereoscopic imaging device minus the convergence bias distance.

5. The stereoscopic imaging device defined in claim 1 wherein the circuitry that identifies the region of interest in the scene comprises a touch screen display that displays images from at least one of the left and right arrays and wherein the circuitry that identifies the region of interest in the scene identifies the region of interest based on touch input received from a user using the touch screen display.

6. The stereoscopic imaging device defined in claim 1 wherein the circuitry that identifies the region of interest in the scene comprises motion tracking circuitry that tracks the motion of at least one object in the scene and wherein the convergence control circuitry adjusts the adjustable point of convergence of the left and right arrays in real time to track the motion of the object.

7. The stereoscopic imaging device defined in claim 1 wherein the circuitry that identifies the region of interest in the scene comprises face detection circuitry that identifies at least one person's face in the scene and wherein the convergence control circuitry adjusts the adjustable point of convergence of the left and right arrays using location information on the at least one person's face.

8. The stereoscopic imaging device defined in claim 1 wherein the convergence control circuitry comprises image processing circuitry that adjusts the adjustable point of convergence of the left and right arrays by selectively cropping images from the left and right arrays.

9. A method of adjusting convergence in a stereoscopic imaging device that has left and right imaging arrays that are separated from each other by a fixed stereo baseline and that captures stereoscopic images of a scene, wherein there is a distance between the convergence and the stereoscopic imaging device and wherein the left and right imaging arrays are respectively pointed in first and second directions, the method comprising:

identifying a region of interest in the scene; and with convergence control circuitry, automatically adjusting the convergence of the left and right imaging arrays by adjusting the distance between the convergence and the stereoscopic imaging device, without adjusting the first direction, and based on information on the region of interest.

10. The method defined in claim 9 wherein automatically adjusting the convergence of the left and right imaging arrays based on information on the region of interest comprises:

selectively cropping images from the left and right arrays to alter the convergence of the left and right imaging arrays.

11. The method defined in claim 9 wherein there is a given distance between the region of interest and the stereoscopic imaging device and wherein automatically adjusting the convergence of the left and right imaging arrays based on information on the region of interest comprises:

adjusting the adjustable point of convergence of the left and right arrays so that the adjustable point of convergence is equal to the given distance between the region of interest and the stereoscopic imaging device.

12. The method defined in claim 9 further comprising:

receiving user input including a convergence bias distance that shifts the adjustable point of convergence further away from the stereoscopic imaging device, wherein there is a given distance between the region of interest and the stereoscopic imaging device and wherein automatically adjusting the convergence of the left and right imaging arrays based on information on the region of interest comprises:

adjusting the adjustable point of convergence of the left and right arrays so that the adjustable point of convergence is equal to the given distance between the region of interest and the stereoscopic imaging device plus the convergence bias distance.

13. The method defined in claim 9 further comprising:

receiving user input including a convergence bias distance that shifts the adjustable point of convergence closer to the stereoscopic imaging device, wherein there is a given distance between the region of interest and the stereoscopic imaging device and wherein automatically adjusting the convergence of the left and right imaging arrays based on information on the region of interest comprises:

adjusting the adjustable point of convergence of the left and right arrays so that the adjustable point of convergence is equal to the given distance between the region of interest and the stereoscopic imaging device minus the convergence bias distance.

14. The method defined in claim 9 wherein, with the convergence control circuitry, automatically adjusting the convergence of the left and right imaging arrays comprises adjusting the distance between the convergence and the stereoscopic imaging device without adjusting the second direction.

15. The stereoscopic imaging device defined in claim 1 further comprising:

at least a first mirror that reflects light towards the left array; and at least a second mirror that reflects light towards the right array, wherein the convergence control circuitry comprises image processing circuitry that adjusts the adjustable point of convergence of the left and right arrays by selectively rotating the first and second mirrors.

* * * * *